(12) United States Patent
Lavature

(10) Patent No.: US 9,790,406 B2
(45) Date of Patent: *Oct. 17, 2017

(54) IMPACT-RESISTANT FILM

(71) Applicant: Berry Plastics Corporation, Evansville, IN (US)

(72) Inventor: Adalbert E Lavature, Huntington, MA (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/045,450

(22) Filed: Oct. 3, 2013

(65) Prior Publication Data

US 2014/0037883 A1    Feb. 6, 2014

Related U.S. Application Data

(63) Continuation-in-part of application No. 13/274,837, filed on Oct. 17, 2011.

(Continued)

(51) Int. Cl.
  *C09J 7/02*   (2006.01)
  *F41H 5/04*   (2006.01)
(Continued)

(52) U.S. Cl.
  CPC ............ *C09J 7/0207* (2013.01); *B32B 7/12* (2013.01); *B32B 25/042* (2013.01); *B32B 25/14* (2013.01);
(Continued)

(58) Field of Classification Search
  CPC ..... E04C 1/40; E04H 1/40; E04H 1/00; E06B 3/28; E04B 2/02; B29C 67/00; F41H 5/00; F41H 5/023; F41H 5/06; A62C 2/00; A62C 2/06; B32B 5/02; B32B 5/16; B32B 7/12; B32B 9/04; B32B 15/04; B32B 15/08; B32B 15/095; B32B 15/14; B32B 27/06; B32B 27/12; B32B 33/00
  USPC .... 428/41.1, 41.8, 98, 195.1, 212, 213, 214, 428/215, 221, 317.7, 323, 339, 343, 354, 428/913, 920, 921, 423.1; 89/36.01, 89/36.04, 902, 918; 109/80; 442/134, 442/135; 52/202, 203, 408, 409, 410, 52/411, 506.01, 796.1, 800.1
  See application file for complete search history.

(56) References Cited

U.S. PATENT DOCUMENTS 230,228 A    7/1880  Boyd
443,732 A   12/1890  Steele
(Continued)

FOREIGN PATENT DOCUMENTS

EP    1243716 A1    9/2002
EP    2125367 A2   12/2009
(Continued)

OTHER PUBLICATIONS

Dinan, Porter, Anderl, Blast Protection Elastomer Coating, AFRL Technology Horizons, Sep. 2003, one page.
(Continued)

*Primary Examiner* — Arti Singh-Pandey
(74) *Attorney, Agent, or Firm* — Barnes & Thornburg LLP

(57) ABSTRACT

An impact-resistant film comprises at least one layer of an elastomeric polymer material and an adhesive layer.

11 Claims, 2 Drawing Sheets

Related U.S. Application Data

(60) Provisional application No. 61/710,508, filed on Oct. 5, 2012.

(51) Int. Cl.
*B32B 7/12* (2006.01)
*B32B 25/04* (2006.01)
*B32B 25/14* (2006.01)

(52) U.S. Cl.
CPC .............. *C09J 7/0296* (2013.01); *F41H 5/04* (2013.01); *B32B 2250/03* (2013.01); *B32B 2250/04* (2013.01); *B32B 2250/05* (2013.01); *B32B 2250/248* (2013.01); *B32B 2262/0269* (2013.01); *B32B 2262/101* (2013.01); *B32B 2270/00* (2013.01); *B32B 2274/00* (2013.01); *B32B 2305/08* (2013.01); *B32B 2305/18* (2013.01); *B32B 2307/3065* (2013.01); *B32B 2307/41* (2013.01); *B32B 2307/412* (2013.01); *B32B 2307/414* (2013.01); *B32B 2307/51* (2013.01); *B32B 2307/54* (2013.01); *B32B 2307/552* (2013.01); *B32B 2307/558* (2013.01); *B32B 2307/56* (2013.01); *B32B 2307/5825* (2013.01); *B32B 2307/71* (2013.01); *B32B 2307/714* (2013.01); *B32B 2307/7145* (2013.01); *B32B 2307/748* (2013.01); *B32B 2375/00* (2013.01); *B32B 2405/00* (2013.01); *B32B 2419/00* (2013.01); *B32B 2571/02* (2013.01); *B32B 2605/08* (2013.01); *B32B 2607/02* (2013.01); *C08L 2201/02* (2013.01); *C09J 2201/162* (2013.01); *C09J 2201/606* (2013.01); *C09J 2201/622* (2013.01); *C09J 2400/163* (2013.01); *C09J 2421/006* (2013.01); *C09J 2423/046* (2013.01); *C09J 2423/106* (2013.01); *C09J 2433/00* (2013.01); *C09J 2475/00* (2013.01); *C09J 2475/006* (2013.01); *C09J 2483/006* (2013.01); *Y10T 428/1476* (2015.01); *Y10T 428/249985* (2015.04); *Y10T 428/269* (2015.01); *Y10T 428/2848* (2015.01)

(56) References Cited

U.S. PATENT DOCUMENTS

| | | |
|---|---|---|
| 1,444,405 A | 2/1923 | Wagemaker |
| 1,990,656 A | 2/1935 | Kotrbaty |
| 2,104,872 A | 1/1938 | Levy |
| 2,235,001 A | 3/1941 | Allen |
| 2,806,277 A | 9/1957 | Hand et al. |
| 3,029,172 A | 4/1962 | Glass |
| 3,235,039 A | 2/1966 | O'Donnell |
| 3,522,140 A | 7/1970 | Hartzell et al. |
| 3,648,613 A | 3/1972 | Cunn et al. |
| 3,649,324 A | 3/1972 | Payne |
| 3,703,201 A | 11/1972 | Musyt et al. |
| 3,801,416 A | 4/1974 | Gulbierz |
| 3,934,066 A | 1/1976 | Murch |
| 4,075,386 A | 2/1978 | Willdorf |
| 4,104,842 A | 8/1978 | Rockstead et al. |
| 4,125,984 A | 11/1978 | Jonas |
| 4,139,591 A | 2/1979 | Jurisich |
| 4,175,357 A | 11/1979 | Goldhaber |
| 4,185,437 A | 1/1980 | Robinson |
| 4,226,071 A | 10/1980 | Bennett |
| 4,253,288 A | 3/1981 | Chun |
| 4,269,004 A | 5/1981 | Schiebroek |
| 4,297,820 A | 11/1981 | Artzer |
| 4,416,096 A | 11/1983 | Schuster et al. |
| 4,433,732 A | 2/1984 | Licht |
| 4,505,208 A | 3/1985 | Goldman |
| 4,558,552 A | 12/1985 | Reitter, II |
| 4,562,666 A | 1/1986 | Young |
| 4,616,456 A | 10/1986 | Parker |
| 4,625,484 A | 12/1986 | Oboler |
| 4,640,074 A | 2/1987 | Paakkinen |
| 4,652,494 A * | 3/1987 | Bravet .............. B32B 17/10018 156/331.4 |
| 4,664,967 A | 5/1987 | Tasdemiroglu |
| 4,730,023 A | 3/1988 | Sato et al. |
| 4,731,972 A | 3/1988 | Anderson |
| 4,732,803 A | 3/1988 | Smith, Jr. |
| 4,780,351 A | 10/1988 | Czempoyesh |
| 4,822,657 A | 4/1989 | Simpson |
| 4,970,838 A | 11/1990 | Phillips |
| 5,037,690 A | 8/1991 | Kooy |
| 5,076,168 A | 12/1991 | Yoshida et al. |
| 5,100,721 A | 3/1992 | Akao |
| 5,104,726 A | 4/1992 | Ross |
| 5,124,195 A | 6/1992 | Harpell et al. |
| 5,190,802 A | 3/1993 | Pilato |
| 5,200,256 A | 4/1993 | Dunbar |
| 5,215,811 A * | 6/1993 | Reafler ................... B29C 51/14 428/212 |
| 5,249,534 A | 10/1993 | Sacks |
| 5,316,839 A | 5/1994 | Kato et al. |
| 5,347,775 A | 9/1994 | Santos |
| 5,348,804 A | 9/1994 | Vasselin |
| 5,427,842 A * | 6/1995 | Bland ....................... B32B 7/02 428/213 |
| 5,487,248 A | 1/1996 | Artzer |
| 5,506,057 A * | 4/1996 | Olson ..................... B32B 17/10 156/102 |
| 5,506,310 A | 4/1996 | Vasselin |
| 5,517,894 A | 5/1996 | Bohne et al. |
| 5,524,412 A | 6/1996 | Corl |
| 5,563,364 A | 10/1996 | Alhamad |
| 5,576,511 A | 11/1996 | Alhamad |
| 5,582,906 A | 12/1996 | Romesberg et al. |
| 5,591,933 A | 1/1997 | Li et al. |
| 5,604,019 A | 2/1997 | Bland et al. |
| 5,616,418 A | 4/1997 | Vasselin |
| 5,649,398 A | 7/1997 | Isley, Jr. et al. |
| 5,811,719 A | 9/1998 | Madden, Jr. |
| 5,813,174 A | 9/1998 | Waller |
| 5,822,940 A | 10/1998 | Carlin et al. |
| 5,856,426 A | 1/1999 | Takahashi et al. |
| 5,937,595 A | 8/1999 | Miller |
| 5,974,762 A | 11/1999 | Rodgers |
| 6,021,524 A | 2/2000 | Wu et al. |
| 6,053,662 A | 4/2000 | Scuero |
| 6,099,768 A | 8/2000 | Strickland et al. |
| 6,112,489 A | 9/2000 | Zweig |
| 6,138,420 A | 10/2000 | Fyfe |
| 6,161,462 A | 12/2000 | Michaelson |
| 6,176,920 B1 | 1/2001 | Murphy et al. |
| 6,212,840 B1 | 4/2001 | Davidovitz |
| 6,269,597 B1 | 8/2001 | Haas |
| 6,298,607 B1 | 10/2001 | Mostaghel et al. |
| 6,298,882 B1 | 10/2001 | Hayes et al. |
| 6,309,732 B1 | 10/2001 | Lopez-Anido et al. |
| 6,314,858 B1 | 11/2001 | Strasser |
| 6,355,345 B1 * | 3/2002 | Furuya .............. B32B 17/10018 428/343 |
| 6,439,120 B1 | 8/2002 | Bureaux et al. |
| 6,455,131 B2 | 9/2002 | Lopez-Anido et al. |
| 6,460,304 B1 | 10/2002 | Kim |
| 6,500,775 B1 | 12/2002 | Mantegna |
| 6,503,855 B1 | 1/2003 | Menzies et al. |
| 6,524,679 B2 | 2/2003 | Hauber et al. |
| 6,543,371 B1 | 4/2003 | Gardner |
| 6,548,430 B1 | 4/2003 | Howland |
| 6,703,104 B1 | 3/2004 | Neal |
| 6,709,736 B1 | 3/2004 | Gruber et al. |
| 6,718,861 B1 | 4/2004 | Anderson, Jr. et al. |
| 6,745,535 B2 | 6/2004 | Nordgren et al. |
| 6,806,212 B2 | 10/2004 | Fyfe |
| 6,820,381 B1 | 11/2004 | Ballough |
| 6,841,791 B2 | 1/2005 | DeMeo et al. |
| 6,873,920 B2 | 3/2005 | Dunleavy et al. |

(56) References Cited

U.S. PATENT DOCUMENTS

| | | | |
|---|---|---|---|
| 6,898,907 B2 | 5/2005 | Diamond | |
| 6,904,732 B1 | 6/2005 | Richmond | |
| 6,907,811 B2 | 6/2005 | White | |
| 6,927,183 B1 | 8/2005 | Christen | |
| 6,991,124 B1 | 1/2006 | Palley et al. | |
| 7,067,592 B2 | 6/2006 | Chino et al. | |
| 7,077,048 B1 | 7/2006 | Anderson, Jr. et al. | |
| 7,138,175 B2 | 11/2006 | Saito | |
| 7,148,162 B2 | 12/2006 | Park et al. | |
| 7,148,313 B2 | 12/2006 | Koga et al. | |
| 7,185,778 B1 | 3/2007 | Palley et al. | |
| 7,314,858 B2 | 1/2008 | Lehrer et al. | |
| 7,906,202 B2* | 3/2011 | Padiyath | B32B 27/20 428/212 |
| 2001/0049025 A1 | 12/2001 | Kollaja et al. | |
| 2002/0025441 A1* | 2/2002 | Hieda | B32B 17/10018 428/440 |
| 2002/0160144 A1 | 10/2002 | Higins et al. | |
| 2002/0184841 A1 | 12/2002 | Diamond | |
| 2003/0079430 A1 | 5/2003 | Hanks | |
| 2003/0104738 A1 | 6/2003 | Porter | |
| 2003/0129900 A1 | 7/2003 | Chiou | |
| 2003/0148681 A1 | 8/2003 | Fyfe | |
| 2003/0199215 A1 | 10/2003 | Bhatnagar et al. | |
| 2003/0211333 A1* | 11/2003 | Watanabe | B32B 7/02 428/422.8 |
| 2004/0048022 A1 | 3/2004 | Pratt | |
| 2004/0058603 A1 | 3/2004 | Hayes | |
| 2004/0103614 A1 | 6/2004 | Hanks et al. | |
| 2004/0123541 A1 | 7/2004 | Jewett | |
| 2004/0148890 A1 | 8/2004 | Miniter | |
| 2004/0161989 A1 | 8/2004 | Dennis et al. | |
| 2004/0166755 A1 | 8/2004 | Bergmans et al. | |
| 2004/0221534 A1 | 11/2004 | Hanks | |
| 2005/0077826 A1* | 4/2005 | Watanabe | B32B 7/02 313/587 |
| 2005/0084647 A1 | 4/2005 | Menzies et al. | |
| 2005/0144900 A1 | 7/2005 | Hallissy et al. | |
| 2005/0170720 A1 | 8/2005 | Christiansen et al. | |
| 2005/0186415 A1* | 8/2005 | McCormick | B32B 17/10009 428/336 |
| 2005/0188825 A1 | 9/2005 | Sharpe et al. | |
| 2005/0223651 A1 | 10/2005 | Kornbak et al. | |
| 2005/0242093 A1 | 11/2005 | Sharpe et al. | |
| 2006/0013977 A1 | 1/2006 | Duke et al. | |
| 2006/0019062 A1 | 1/2006 | Hanks et al. | |
| 2006/0065111 A1 | 3/2006 | Henry | |
| 2006/0090673 A1 | 5/2006 | Simmonsen et al. | |
| 2006/0093810 A1* | 5/2006 | Blake | B32B 7/12 428/343 |
| 2006/0105156 A1 | 5/2006 | Simmonsen et al. | |
| 2006/0150554 A1 | 7/2006 | Hanks et al. | |
| 2006/0265985 A1 | 11/2006 | Nichols | |
| 2007/0006542 A1 | 1/2007 | Duke | |
| 2007/0011962 A1 | 1/2007 | Erskine | |
| 2007/0026180 A1 | 2/2007 | Lavature | |
| 2007/0128963 A1 | 6/2007 | Vogt et al. | |
| 2007/0194482 A1 | 8/2007 | Douglas et al. | |
| 2007/0281562 A1 | 12/2007 | Kohlman | |
| 2008/0261014 A1* | 10/2008 | McGuire | B29C 37/0025 428/297.1 |
| 2009/0004430 A1 | 1/2009 | Cummins et al. | |
| 2009/0120557 A1 | 5/2009 | Serra et al. | |
| 2009/0155601 A1 | 6/2009 | Lavature et al. | |
| 2009/0233067 A1* | 9/2009 | Doornheim | B32B 7/02 428/203 |
| 2009/0274922 A1* | 11/2009 | Roys | B29C 45/14811 428/532 |
| 2010/0032082 A1 | 2/2010 | Ho et al. | |
| 2012/0088050 A1* | 4/2012 | Lavature | 428/41.1 |

FOREIGN PATENT DOCUMENTS

| | | |
|---|---|---|
| GB | 2277710 | 11/1994 |
| JP | 62-273827 | 11/1987 |
| JP | 02-274534 | 11/1990 |
| JP | 4227958 | 8/1992 |
| JP | 2574554 B2 | 1/1997 |
| WO | 8903764 | 5/1989 |
| WO | 2004092495 | 10/2004 |
| WO | 2005118275 A2 | 12/2005 |
| WO | 2006050419 | 5/2006 |
| WO | 2007027993 | 3/2007 |
| WO | 2007073363 | 6/2007 |
| WO | 2008/130726 A2 | 10/2008 |
| WO | 2008130726 | 10/2008 |
| WO | 2008130726 A2 | 10/2008 |

OTHER PUBLICATIONS

"StormBlocker Shelter System Provides Protection Against Severe Weather Events", Norplex Micarta High Performance Thermoset Composites, Oct. 20, 2005, three pages.

Johnson, "New Steel-Composite Wall Sets Standard in Safe Room Security", IAPD Magazine, Apr./May 2006, two pages.

Vossoughi, Ostertag, Monteiro, Johnson, "Resistance of Concrete Protected by Fabirc to Projectile Impact", Cement and Concrete Research 37 (2007), 11 pages.

Steve@BuildingOnline.com, "Blast Resistant Panels Being Readied for Mass Market", Sep. 1, 2004, two pages.

International Search Report dated Jul. 30, 2009, for PCT/US2008/051207.

International Search Report dated Jun. 28, 2013, relating to International Application No. PCT/US2012/060554.

PCT International Search Report and Written Opinion dated Jan. 28, 2014 and issued in connection with PCT/US2013/063374.

Supplemental European Search Report, Application No. 12864834.2-1303 / 2768665, PCT/US2012/060554, dated May 4, 2015, 10 pages.

European Office Action, European Application No. 12864834.1-1303, dated May 17, 2016, 8 pages.

Extended EP Search Report dated May 4, 2015 and issued in connection with European Patent Application No. 12864834.2, 9 pages.

Suhaimi et al., "Puncture Resistance of Twaron Fabric Layers with Different Stitching Patterns," International Journal of Textile Science, 2012, 1(5), pp. 44-48, 5 pages.

International Search Report dated Feb. 19, 2009, for International Application No. PCT/US2008/051207.

"New Coating Shows Promise for Strengthening Buildings Against Terrorist Explosions." www.ml.afrl.af.mil . . . .

"StormBlocker Shelter System Provides Protection Against Severe Weather Events", found at http://norplex-micarta.com/products . . . , Oct. 20, 2005, 3 Pgs.

"High Performace Thermoset Composites for the Ballistic Protection Industry", found at http://norplex-micarta.com/markets . . . , 2 Pgs.

Israeli Office Action for Israeli App. No. 231977 dated Mar. 26, 2017, TC-00408CIP, 5 pages.

Office Action dated Jul. 13, 2017 for U.S. Appl. No. 13/274,837; (pp. 1-17).

* cited by examiner

IMPACT-RESISTANT FILM

CROSS-REFERENCE TO RELATED APPLICATIONS

This application claims priority under 35 U.S.C. §119(e) to U.S. Provisional Application Ser. No. 61/710,508, filed on Oct. 5, 2012, entitled Impact-Resistant Film and is a continuation-in-part of U.S. application Ser. No. 13/274,837, filed Oct. 17, 2011, entitled Reinforced Flame Retardant Film For Blast Resistance Protection, both of which are expressly incorporated by reference herein.

BACKGROUND

The present disclosure relates to a film, and in particular, an elastomeric, polymer, laminate film. More particularly, the present disclosure relates to an elastomeric, polymer, laminate film having puncture resistance.

SUMMARY

According to the present disclosure, a sheet includes an adhesive layer and a release liner coupled to the adhesive layer to protect the adhesive layer during storage and shipping. In illustrative embodiments, during installation of the sheet on a surface of a wall included in a building, the release liner is removed to expose the adhesive layer of the sheet. The adhesive layer is then pressed onto the surface of the wall to cause the sheet to be coupled to the wall.

In illustrative embodiments, a sheet includes a release liner, an adhesive layer, and an impact-resistant film. The adhesive layer is located between the release liner and the impact-resistant film. During installation, the release liner is removed from the adhesive layer to expose the adhesive layer. The exposed adhesive layer and impact-resistant film are then pressed against a surface of the wall to cause the adhesive layer to couple the impact-resistant film to the surface of the wall to maximize structural integrity of the wall, maximize puncture resistance of the wall, and minimize damage to the wall in response to an impact to the wall.

In illustrative embodiments, the impact-resistant film is an elastomeric polymer laminate. The elastomeric polymeric laminate comprises thermoplastic polyurethane.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

In exemplary embodiments, a sheet 100 according to the present disclosure is applied to a wall 10 to mitigate the effects of a force, such as, but not limited to, a blast force, applied to wall 10. As additional examples, force may be applied to wall 10 from natural disasters such as hurricanes, tornadoes, and thunderstorms.

Figure 1:
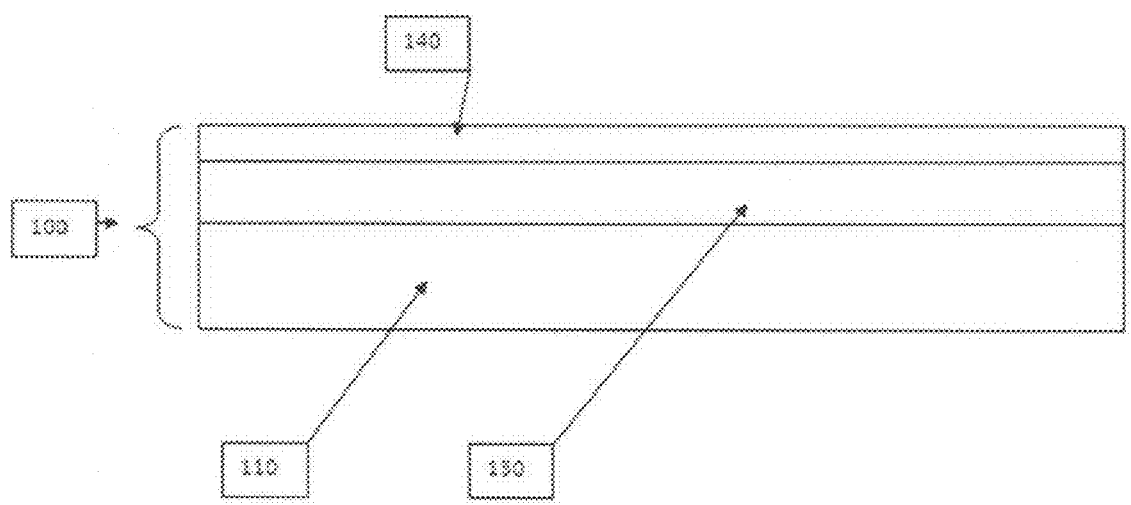
FIG. 1 is a diagrammatic view of a sheet in accordance with one exemplary embodiment of the present disclosure showing that the sheet includes, from top to bottom, a release liner, an adhesive layer, and at least one layer of an elastomeric polymer film.

In exemplary embodiments, sheet 100 includes a release liner 140, an adhesive layer 130, and an impact-resistant film 110 as shown diagrammatically, for example, in FIG. 1. In exemplary embodiments, sheet 100 may have an illustrative thickness of about 10 mils to 100 mils. In exemplary embodiments, sheet 100 may have an illustrative thickness of about 80 mils. In exemplary embodiments, sheet 100 may have a thickness of about 48 mils.

In one illustrative example, impact-resistant film 110 is an elastomeric polymer laminate 110. In exemplary embodiments, elastomeric polymer laminate 110 maximizes tensile strength, puncture resistance, flex fatigue resistance, low temperature flexibility, high impact strength, chemical and hydrolysis resistance, and general elastomeric properties. In exemplary embodiments, elastomeric polymer laminate 110 comprises at least one of polyurethane, natural and synthetic rubber and blends thereof, foam, other thermoplastic elastomers or polyolefins, or the like, and mixtures and combinations of the foregoing. In exemplary embodiments, the elastomeric polymer laminate 110 may comprise a first elastomeric polymer material and a second elastomeric polymer material. In exemplary embodiments, the first and second materials may be the same. In exemplary embodiments, the first and second materials may be different.

In one illustrative example, elastomeric polymer laminate 110 comprises about 30% to about 90% ESTANE™ 58887 by weight and about 10% to about 70% ETE 50DT3 by weight. In another illustrative example, elastomeric polymer laminate comprises about 80% ESTANE™ 58887 by weight and about 20% ETE 50DT3 by weight.

In other exemplary embodiments of an impact-resistant film in accordance with the present disclosure, the film comprises a multilayer elastomeric polymer laminate in which each layer of laminate may comprise different urethanes and/or different blends of urethane or other polymers. Each layer of the laminate may incorporate other urethanes or polymers that provide different material properties. As an example, a layer of the elastomeric polymer laminate may comprise up to about 20% polyester-based thermoplastic polyurethane. The polyester-based thermoplastic polyurethane may be Estane 5713 which is commercially available from the Lubrizol Corporation.

In exemplary embodiments, elastomeric polymer laminate 110 may further include additives or stabilizers to enhance particular properties of sheet 100. For example, in one exemplary embodiment, elastomeric polymer laminate 110 may include stabilizers to maximize UV resistance and minimize thermal degradation.

Stabilizers include, but are not limited to, any high molecular weight stabilizer. In exemplary embodiments, stabilizers may comprise at least a Hindered Amine Light Stabilizer (HALS). In other exemplary embodiments, the light stabilizer comprises an ultraviolet light absorbing agent, such as, but not limited to, 3,5-di-t-butyl-4-hydroxybenzoic acid, hexadecyl ester. In exemplary embodiments, the light stabilizer comprises an ultraviolet light absorbing agent and free radical scavenger which is commercially available from CYTEC Industries, Inc., located at West Paterson, N.J., under the name CYASORB® stabilizer UV-2908. In exemplary embodiments, the stabilizer comprises a UV light stabilizer which is commercially available from Ciba Specialty Chemicals Corp. of Tarrytown, N.Y., under the name TINUVIN® 765.

In exemplary embodiments, elastomeric polymer laminate 110 may further include antioxidants. Antioxidants may include, but are not limited to, hindered phenols or multifunctional phenols such as those containing sulfur or phosphorus. The performance of either the stabilizers or the antioxidants may be further enhanced by using synergists such as, but not limited to, thiodipropionate esters and phosphites, and/or chelating agents and metal deactivators, for example, ethylenediamine tetraacetic acid, salts thereof, and disalicylalpropylenediimine.

In exemplary embodiments, elastomeric polymer laminate 110 may further include other agents. In one example, one of the other agents is a fungicide applied to the elastomeric polymer laminate 110 to minimize fungal growth. Exemplary fungicides include, but are not limited to, miconazol, amphotericin B, nystatin, griseofulvin, and the like. In exemplary embodiments, an agent may be a bioactive agent or the like that is configured to block any undesirable biological presence in the film.

In exemplary embodiments, adhesive layer 130 is a Pressure-Sensitive Adhesive (PSA). In exemplary embodiments, the pressure-sensitive adhesive may comprise at least one of silicone, natural or synthetic rubber, thermoplastic elastomer, polyurethane, water or solvent based acrylic, mixtures or combinations of the foregoing, or the like. In exemplary embodiments, adhesive layer 130 comprises at least one of an anaerobic, cyanoacrylate, epoxy, phenolic, polyimide, hot melt, butyl-based, plastisol, polyvinyl acetate (PVA), or the like, including combinations and blends thereof.

In exemplary embodiments, adhesive layer 130 may also be an acrylic pressure-sensitive adhesive which is commercially available under the name National Starch 80-178A from National Starch and Chemical, with offices in Bridgewater, N.J. In another example, adhesive layer 130 comprises a urethane-based pressure sensitive adhesive which is commercially available under the name SZ-0670A PSA from Worthen Industries, of Nashua, N.H. Various blends of adhesives may be used to produce adhesive layer 130.

Adhesive layer 130 may include antioxidants. Antioxidants may include hindered phenols or multifunctional phenols such as those containing sulfur or phosphorus. An illustrative antioxidant is commercially available under the name BNX-1225 Mayzo from McDonald of Pennsylvania.

Adhesive layer 130 may further comprise solvents. In one example, the solvent includes methylbenzene or phenylmethane, also known as Toluene.

Performance of adhesive layer 130 may be further enhanced by using synergists. Examples of synergists include thiodipropionate esters and phosphites, or chelating agents, metal deactivators, for example, ethylenediamine tetraacetic acid, salts thereof, and disalicylalpropylenediimine, or catalysts, for example, isocyanate-catalysts, hydroxyl-catalysts and the like. One example of a synergist included in adhesive layer 130 is an isocyanate-catalyst which is commercially available under the name Mondor MR-Light from Mozel Industries, of Columbia, Ill. Another example of a synergist included in adhesive layer 130 is polyfunctional azirdine which is commercially available under the name PZ-33 from Polyaziridine, LLC, of Medford, N.J.

In exemplary embodiments, adhesive layer 130 may further include additives or stabilizers to enhance particular properties of the adhesive. For example, in one exemplary embodiment, adhesive layer 130 may comprise stabilizers to maximize UV resistance and minimize thermal degradation.

In one illustrative example, adhesive layer 130 may comprise about 70.0% to about 95.0% of an acrylic pressure-sensitive adhesive, between about 5.0% and about 15.0% urethane-based pressure-sensitive adhesive, between about 0.0% and about 1.5% antioxidant, between about 1.0% and about 2.0% of a solvent, and between about 0.0% and about 1.0% of a catalyst. In another example, adhesive layer 130 may comprise about 86.56% acrylic pressure-sensitive adhesive, about 11.08% urethane-based pressure sensitive adhesive, about 0.75% antioxidant, about 1.5% toluene, and about 0.11% isocyanate catalyst.

In exemplary embodiments, adhesive layer 130 may have a thickness of between about 2 mils and about 75 mils. In another example, adhesive layer 130 may have a thickness between about 6 mils and about 10 mils. In still yet another example, adhesive layer 130 may have a thickness between about 6.8 mils and about 7.2 mils.

In exemplary embodiments, sheet 100 includes release liner 140, adhesive layer 130, and impact-resistant film 110, as shown in FIG. 1. In exemplary embodiments, release liner 140 is coupled to an exposed side of adhesive layer 130 in the factory prior to shipping. In one illustrative example, release liner 140 may be a silicone liner material, or non-silicone liner material, such as polyvinyl octadecylcarbamate. In another example, release liner 140 includes, but is not limited to, polyvinyl stearylcarbamate, vinyl acrylic emulsion release liner material, and a fluorochemical emulsion with an acrylic backbone.

Release liner 140 may further include materials which are suitable for a secondary purpose. As an example, release liner 140 may be used as a floor covering or general purpose tarp. As a result, release liner 140 may include a substantially resilient material, such as nylon, vinyl, urethane, polyester, or the like.

Another exemplary embodiment of a sheet in accordance with the present disclosure includes an adhesive layer, an elastomeric polymer laminate, and a release layer. The adhesive layer may be applied to one side of the elastomeric polymer laminate and the release layer may be applied to the opposite side of the elastomeric polymer laminate. The sheet may be wound to form a roll. In this embodiment, the sheet lacks the release liner causing the force required to unroll the sheet is less than it would be with a sheet having the release liner. The release layer may be a non-silicone material, for example polyvinyl octadecylcarbamate or polyvinyl stearylcarbamate.

Sheet 100 may be manufactured using a manufacturing process. The manufacturing process may include the steps of extruding or calendaring a molten resin at a temperature between about 350 degrees Fahrenheit to 500 degrees Fahrenheit to form a film 110 having a thickness, applying an adhesive by laminating, transfer coating, or direct coating film 110 to form adhesive layer 130, and applying release liner 140. Sheet 100 may be further processed by rolling sheet 100 to form a roll. Adhesive layer 130 may be applied in-line with the above steps or as a separate process.

Sheet 100 may be applied to any surface of an object or structure for the purpose of increasing the structural integrity of such surface. As an example, sheet 100 may be coupled to an interior or exterior wall of a dwelling or building to provide additional strength to the wall on which sheet 100 is coupled.

Sheet 100, including film 110, adhesive layer 130, and release liner 140 may provided for application to a wall of a building. In an example of use during application, release liner 140 is separated from adhesive layer 130 exposing adhesive layer 130. The remaining adhesive layer 130 and film 110 may then be coupled to a surface of the wall in a peel-and-stick fashion. The surface of the wall of the building may be coated with a primer or other chemical to maximize bonding strength and minimize bonding time between the wall and adhesive layer 130.

Figure 3:
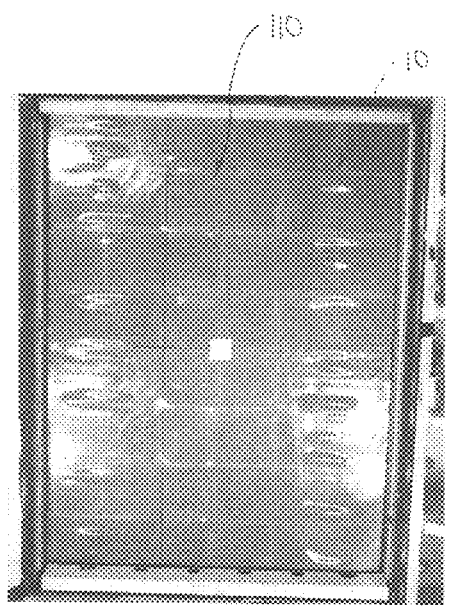
FIG. 3 is a photograph showing a sheet of film according to an exemplary embodiment coupled to the test wall before a test is performed.
Figure 4:
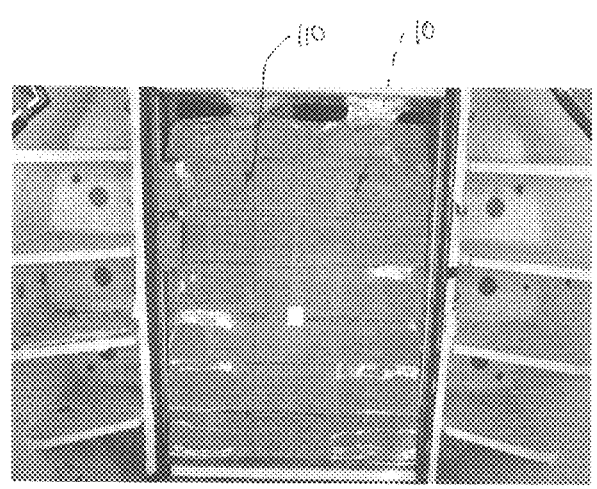
FIG. 4 is a photograph showing the sheet of FIG. 3 coupled to the test wall after a test is performed.

In exemplary embodiments, sheet 100, when coupled to wall 10, as suggested in FIGS. 3 and 4, may have a puncture resistance of between about 3,000 pounds per square inch and about 25,000 pounds per square inch. In exemplary embodiments, sheet 100 may have a puncture resistance of between about 10,000 pounds per square inch to about 20,000 pounds per square inch. In exemplary embodiments, sheet 100 may have a puncture resistance of at least about 5,000 pounds per square inch.

In one illustrative example, the surface of the wall faces toward an interior of the building and is referred to as an inner surface of the wall. Sheet 100 may also be coupled to an outer surface of the wall that faces opposite the inner surface of the wall. The wall may be located between the interior and an exterior of the building. When sheet 100 is applied to the outer surface of the wall, the sheet may be located between the outer surface of the wall and wall treatments coupled to the wall. Wall treatments include siding, shingles, bricks, and any other suitable materials. Sheet 100 maximizes structural integrity of wall maximizing time for occupants of the building to exit or remove equipment from the building before a possible collapse of the building. Maximized structural integrity may also block external wall material or debris outside the building from moving through sheet 100 and injuring occupants in the building.

Sheet 100 may also be coupled to an inner surface or an outer surface of a vehicle. The vehicle may be armored or unarmored. Sheet 100 maximizes structural strength to the vehicle. Sheet 100 may block or minimize injury to occupants from debris moving from outside the vehicle to inside the vehicle.

Sheet 100 may also be used in a remedial manner after damage has occurred to a building. As an example, a building may be damaged by a tornado. Sheet 100 may be applied to the inner surface of the walls of the building so that search, rescue, and evacuation may continue while minimizing the risk of falling debris and collapse of the building. In another example, sheet 100 may be coupled to a damaged vehicle to maximize structural support of the damage vehicle for short periods of time and minimize further degradation of the vehicle during limited use.

Sheet 100 may also be used as a structural reinforcement for non-occupant structures. Non-occupant structures include, but are not limited to, levees and dams. Sheet 100 may be coupled to a surface of a levee to maximize structural integrity of the levee while minimizing risk of rupture of the levee or maximizing an amount of time for additional actions to be taken. Additional measures may include reinforcing the levee, draining water, and evacuating those from the area that may be affected by the damaged levee.

In another example of use, the wall of the building may be further prepared by applying an adhesive to the wall to maximize bonding between the surface and sheet 100. For example, a primer and/or adhesive may be sprayed, brushed or otherwise applied to the surface to be protected prior to the application of sheet 100. Similarly, initial cleaning of the surface may be performed to maximize bonding.

Impact-resistant film 110 may be coupled to a wall without adhesive layer 130. In an example of use, impact-resistant film 110 is coupled to the wall using any suitable fastening. Fastening means include a chemical fasteners (such as, but not limited to, adhesives, epoxies, and the like) or mechanical fasteners (such as, but not limited to, staples, nails, screws, bolts, clamps, or the like).

In another example, impact-resistant film 110 may be anchored to a wall, ceiling, or other structure using clamps. A clamp may be made from any suitable material such as metal or plastics material. A clamp couples impact-resistant film 110 to a surface by coupling the clamp to a frame included in the structure and trapping a portion of impact-resistant film 110 therebetween. As a further example, a clamp may be used with an adhesive on the impact-resistant film 110 to maximize coupling to the structure.

In still yet another example, impact-resistant film 110 may be coupled to building/construction materials. Impact-resistant film 110 may be adhered, laminated, extrusion coated, or fastened to a building material at the time of manufacture of the building construction material or at a time prior to distribution of the building materials. Building materials include wall panels, cellulosic sheets, plywood, drywall, FORTICRETE™, cinderblocks, walling stone, brick, house wrap, sheathing, and the like.

In an example of use, impact-resistant film 110 may be coupled to a drywall sheet. Impact-resistant film 110 may be coupled to the drywall sheet by extrusion coating. The coated drywall sheet may then be coupled to the structure in a manner similar to an uncoated drywall sheet.

One or more sheets 100 may be applied to a surface of a wall. To do so, the process described herein with respect to applying one sheet 100 may be repeated. In this example, a first sheet 100 may be coupled to a surface of a wall. A second sheet 100 may then be coupled to first sheet 100 to cause first sheet 100 to be located between the surface of the wall and second sheet 100. While only two sheets were discussed in the example, any number of sheets may be used.

The surface of the wall may be result from many different materials being used to comprise the wall. The materials may include, but are not limited to, concrete, brick, wood, asphalt, glass, cellulosic fibers, dirt, clay, metal, plastic, or any other suitable materials.

Sheet 100 may be used to create a safe room in a building. A safe room is a room in a building that includes structurally reinforced walls, ceiling, and floor. As a result, the room is encapsulated by some form of structural reinforcement. As an example, sheet 100 is coupled to all inner surfaces of the room including walls, ceiling, and floor to establish a safe room. In another example, sheet 100 may be coupled to outer surfaces of the room.

Figure 2:
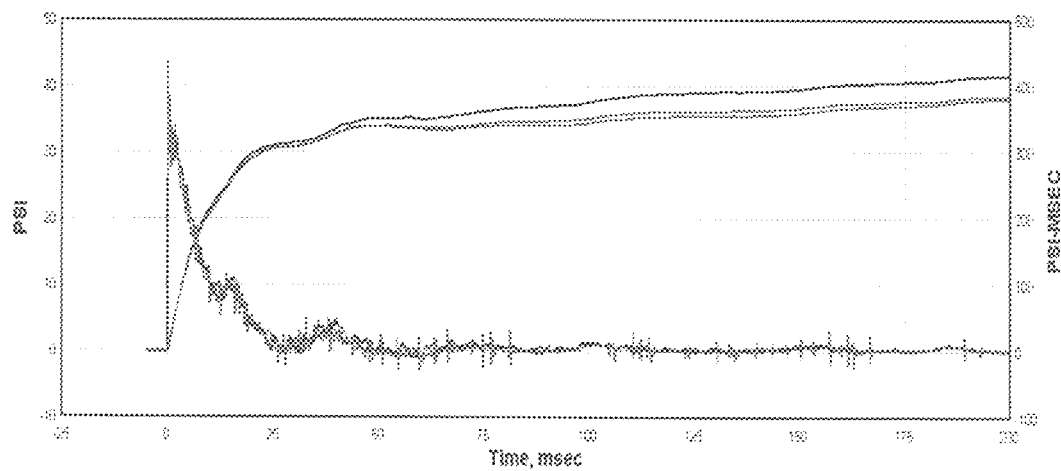
FIG. 2 is a graph showing results obtained from a pressure and impulse test performed on the sheet of FIG. 1 coupled to a test wall.

FIG. 2 is a graph showing the results of a pressure and impulse test on sheet 100 of film according to the present disclosure as applied to a test wall. Sheet 100 maximizes the structural integrity of the test wall so that critical extra time for occupants to exit or remove equipment from the structure is provided before a possible structure collapse.

The disclosure of U.S. Pat. No. 8,039,102, entitled Reinforced Film For Blast Resistance Protection, is expressly incorporated by reference herein in its entirety.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following inventive concepts. It should further be noted that any patents, applications, publications and standard test methods referred to herein are incorporated by reference in their entirety.

The invention claimed is:

1. An impact-resistant film for maximizing the structural integrity of a wall, the impact-resistant film consisting of
a first layer of a first elastomeric polymer material,
a second layer of a second elastomeric polymer material, and
an adhesive layer,
wherein the first and second layers are in continuous contact with each other, and
wherein the film has a puncture resistance in a range of between about 3,000 and about 25,000 pounds per square inch,
wherein the first elastomeric polymer material is a first polyurethane and the second elastomeric polymer material is a second polyurethane and the first and second polyurethanes are different polyurethanes, and
wherein the first polyurethane comprises up to 20% polyester-based thermoplastic polyurethane.

2. The impact-resistant film of claim 1, wherein the adhesive layer comprises a pressure sensitive adhesive and a release liner associated therewith.

3. The film of claim 1, wherein the adhesive layer comprises at least one adhesive selected from the group consisting of silicone, natural or synthetic rubber, thermoplastic elastomer, urethane, polyurethane, water or solvent based acrylic, anaerobic, cyanoacrylate, epoxy, phenolic, polyimide, hot melt, butyl-based, plastisol, polyvinyl acetate, and combinations of at least two of the foregoing.

4. The impact-resistant film of claim 1, wherein the adhesive layer comprises an acrylic pressure sensitive adhesive, a urethane-based pressure sensitive adhesive, an antioxidant, a solvent, a UV stabilizer, and a catalyst.

5. The impact-resistant film of claim 1, wherein the adhesive layer further comprises at least one of a fungicide, chelating agent, metal deactivator, catalyst, stabilizer, antioxidant, UV resistant agent, thermal degradation resistant agent, and solvent.

6. The impact-resistant film of claim 1, wherein the film is configured to be a roll.

7. The impact-resistant film of claim 1, wherein the puncture resistance is in a range of between about 10,000 and about 20,000 pounds per square inch.

8. The impact-resistant film of claim 1, wherein the puncture resistance is at least 5,000 pounds per square inch.

9. A film for maximizing the structural integrity of a wall, the film consisting of
an elastomeric polymer layer comprising at least one polyurethane,
a pressure sensitive adhesive layer associated with the elastomeric polymer layer, and
a release liner layer,
wherein the film is arranged in the order of the release liner layer, the pressure sensitive adhesive layer, and the elastomeric polymer layer, and
wherein the film has a puncture resistance in a range of between about 3,000 and about 25,000 pounds per square inch,
wherein the at least one polyurethane comprises up to 20% polyester-based thermoplastic polyurethane.

10. An impact-resistant film consisting of
an elastomeric layer with first and second elastomeric polymer materials, the elastomeric layer having a thickness of between about 2 mils and about 75 mils, and
an adhesive layer,
wherein the film has a puncture resistance of between about 3,000 psi and about 25,000 psi, the film has a first surface comprising the adhesive layer,
wherein the first elastomeric polymer material is a first polyurethane and the second elastomeric polymer material is a second polyurethane and the first and second polyurethanes are different polyurethanes, and
wherein the first polyurethane comprises up to 20% polyester-based thermoplastic polyurethane.

11. The impact-resistant film of claim 10, wherein the film is configured to be in a roll.

* * * * *